US007113839B2

(12) United States Patent
Ferguson et al.

(10) Patent No.: US 7,113,839 B2
(45) Date of Patent: Sep. 26, 2006

(54) SYSTEM FOR PROVIDING INDEXED MACHINE UTILIZATION METRICS

(75) Inventors: Alan Lewis Ferguson, Peoria, IL (US); Trent Ray Meiss, Eureka, IL (US); Brian Lane Jenkins, Washington, IL (US); Steven Wayne O'Neal, Bartonville, IL (US); Daniel Craig Wood, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 10/929,688

(22) Filed: Aug. 31, 2004

(65) Prior Publication Data

US 2005/0278055 A1 Dec. 15, 2005

Related U.S. Application Data

(60) Provisional application No. 60/574,782, filed on May 27, 2004.

(51) Int. Cl.
*G06F 19/00* (2006.01)

(52) U.S. Cl. ............................. 700/115; 700/2; 700/6; 700/111; 701/33; 702/188

(58) Field of Classification Search .................... 700/2, 700/66, 111, 115; 701/33; 702/188
See application file for complete search history.

(56) References Cited

U.S. PATENT DOCUMENTS

| | | | |
|---|---|---|---|
| 3,624,608 A | 11/1971 | Altman et al. | |
| 3,665,397 A | 5/1972 | Di Napoli et al. | |
| 4,258,421 A | 3/1981 | Juhasz et al. | |
| 5,220,968 A | 6/1993 | Weber | |
| 5,303,163 A | 4/1994 | Ebaugh et al. | |
| 5,400,018 A | 3/1995 | Scholl et al. | |
| 5,463,567 A | 10/1995 | Boen et al. | |
| 5,659,470 A | 8/1997 | Goska et al. | |
| 5,808,907 A | 9/1998 | Shetty et al. | |
| 5,862,500 A | 1/1999 | Goodwin | |
| 5,899,947 A * | 5/1999 | Hall et al. | 701/33 |
| 5,995,898 A | 11/1999 | Tuttle | |
| 6,006,148 A | 12/1999 | Strong | |
| 6,112,152 A | 8/2000 | Tuttle | |
| 6,253,129 B1 | 6/2001 | Jenkins et al. | |
| 6,351,695 B1 | 2/2002 | Weiss | |
| 6,408,232 B1 | 6/2002 | Cannon et al. | |
| 6,526,341 B1 | 2/2003 | Bird et al. | |

(Continued)

FOREIGN PATENT DOCUMENTS

| | | |
|---|---|---|
| JP | 2000-311287 | 11/2000 |

*Primary Examiner*—Leo Picard
*Assistant Examiner*—Douglas S. Lee
(74) *Attorney, Agent, or Firm*—Finnegan, Henderson, Farabow, Garrett & Dunner

(57) ABSTRACT

A system and method for providing indexed work machine utilization data. The system implementing the method includes an operator identification device for identifying an operator of a work machine based on operator identification data and a work data collection device for collecting work data related to the work machine. A first processing device indexes the collected work data to the operator identification data and a communication device transmits the indexed work data and operator identification data to a second processing device. The second processing device receives the indexed work data and the operator identification data and provides operator utilization metrics based on the indexed work data that reflect a quantitative performance value associated with at least one of the work machine and operator.

44 Claims, 7 Drawing Sheets

U.S. PATENT DOCUMENTS

| | | | | |
|---|---|---|---|---|
| 6,584,381 | B1 | 6/2003 | Gehrke | |
| 2002/0099520 | A1 | 7/2002 | Falada et al. | |
| 2003/0069648 | A1* | 4/2003 | Douglas et al. | 700/2 |
| 2003/0163248 | A1 | 8/2003 | Mizuishi | |
| 2003/0182033 | A1* | 9/2003 | Underdahl et al. | 701/29 |
| 2005/0267713 | A1* | 12/2005 | Horkavai et al. | 702/188 |

* cited by examiner

SYSTEM FOR PROVIDING INDEXED MACHINE UTILIZATION METRICS

RELATED APPLICATION

This application claims the benefit of U.S. Provisional Application Ser. No. 60/574,782 entitled, "SYSTEM FOR PROVIDING INDEXED MACHINE UTILIZATION METRICS," filed May 27, 2004, owned by the assignee of this application and expressly incorporated herein by reference in its entirety.

TECHNICAL FIELD

The disclosure relates generally to data collection systems, and more particularly to systems and methods for providing work machine utilization metrics by indexing work data, and perhaps work machine related parameters, to operator identification data.

BACKGROUND

An important feature in modem work machines (e.g., fixed and mobile commercial machines, such as construction machines, fixed engine systems, marine-based machines, etc.), is the on-board network and associated machine control modules. An on-board network includes many different modules connected to various types of communication links. One or more of these modules may be used to monitor and collect work data for the associated work machine. The work data collected by on-board data collection systems are typically transferred from the work machine to the off-board system through manual download operations.

U.S. Pat. No. 5,220,968 ("the '968 patent") discloses a device for loading and moving loads, for example, a wheeled loader, track type loader, shovel loader, crane, scraper, back hoe, etc., that is equipped with various sensors for determining when a load is being moved and what the weight and volume of the load is. The data from the sensor is buffered and supplied to a microprocessor. This is done for a period of time as the operator uses the loading device. The data accumulated for each load moved by the operator is used to determine the efficiency of the operator in using the device. A display provides the operator with various information regarding the load being moved, such as its weight and volume, or the total weight and volume of several loads delivered to a particular location, etc. The same display can be used to provide data regarding the efficiency and productivity of the operator during a work period. A printer is also provided to print out the data.

Although the '968 patent discloses a device for accumulating, displaying, and printing information regarding the load being moved, and there are known on-board systems for collecting work data, the device disclosed in the '968 patent and these known systems do not index the collected work data to operator identification data at the work machine and automatically transmit the indexed work data and operator identification data to an off-board system. Further, the off-board systems do not receive the indexed work data and the operator identification data and performing operator utilization metrics based on the indexed work data.

Methods, systems, and articles of manufacture consistent with certain disclosed embodiments may solve one or more of the problems set forth above.

SUMMARY OF THE INVENTION

A system and method is provided for performing a process for determining indexed work machine utilization metrics. In one embodiment, the process includes identifying an operator of a work machine based on operator identification data, and collecting work data related to the work machine. The collected work data is indexed to the operator identification data and is transmitted to a processing system, where operator utilization metrics are provided based on the indexed work data that reflect a quantitative performance value associated with the work machine and operator.

In another embodiment, a system is provided for providing indexed work machine utilization metrics. The system includes an operator identification device for identifying an operator of a work machine based on operator identification data, and a work data collection device for collecting work data related to the work machine. A first processing device indexes the collected work data to the operator identification data, and a communication device transmits the indexed work data and operator identification data to a second processing device. The second processing device receives the indexed work data and the operator identification data and provides operator utilization metrics based on the indexed work data.

BRIEF DESCRIPTION OF THE DRAWINGS

The accompanying drawings, which are incorporated in and constitute a part of this specification, illustrate several embodiments and together with the description, serve to explain the principles of the disclosed communication system. In the drawings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
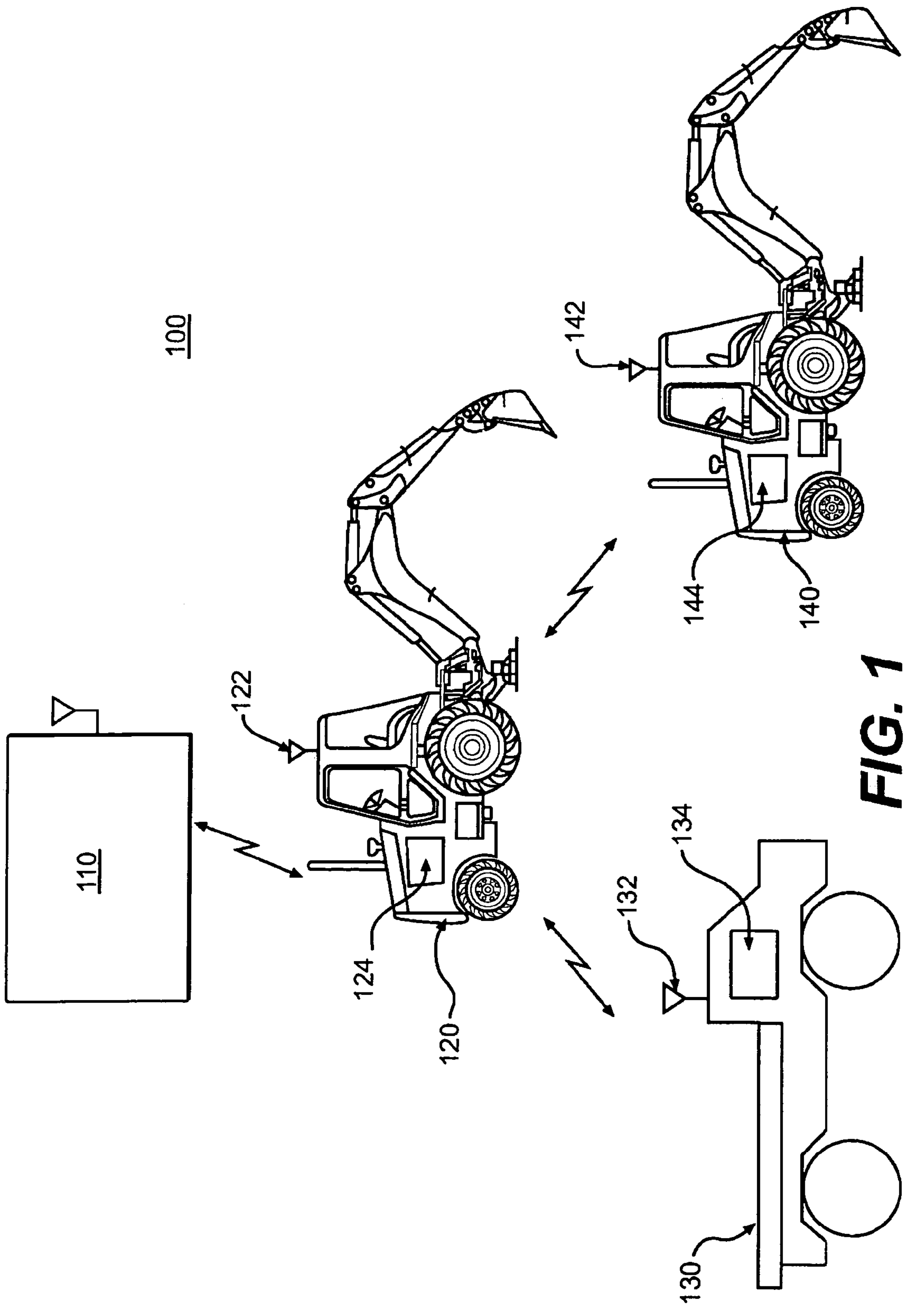
FIG. 1 illustrates a pictorial representation of an exemplary system that may be configured to perform certain functions consistent with certain disclosed embodiments.

FIG. 1 illustrates an exemplary work machine environment 100 in which features and principles consistent with certain disclosed embodiments may be implemented. As shown in FIG. 1, work machine environment 100 may include a remote off-board system 110 and work machines 120, 130, and 140. Each work machine 120, 130, and 140 includes a wireless communication device, such as antennae 122, 132, and 142, and an on-board system 124, 134, and 144, respectively. Although only a specific number of work machines are shown, environment 100 may include any number and types of such machines and/or off-board systems.

Work machine, as the term is used herein, refers to a fixed or mobile machine that performs some type of operation associated with a particular industry, such as mining, construction, farming, etc. and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. As shown in FIG. 1, work machines 120 and 140 are backhoe type work machines, while machine 130 is a hauler-type work machine. The types of work machine illustrated in FIG. 1 are exemplary and not intended to be limiting. It is contemplated by the disclosed embodiments that environment 100 may implement any number of different types of work machines.

An off-board system, as the term is used herein, may represent a system that is located remote from work machines 120, 130, and 140. An off-board system may be a system that connects to work machine 120 through wireline or wireless data links. Further, an off-board system may be a computer system including known computing components, such as one or more processors, software, display, and interface devices that operate collectively to perform one or more processes. Alternatively, or additionally, an off-board system may include one or more communication devices that facilitate the transmission of data to and from work machine 120. In certain embodiments, an off-board system may be another work machine remotely located from work machine 120.

Remote off-board system 110 may represent one or more computing systems associated with a business entity corresponding to work machines 120, 130, and 140, such as a manufacturer, dealer, retailer, owner, project site manager, a department of a business entity (e.g., service center, operations support center, logistics center, etc.), or any other type of entity that generates, maintains, sends, and/or receives information associated with machines 120, 130, and 140. Remote off-board system 110 may include one or more computer systems, such as a workstation, personal digital assistant, laptop, mainframe, etc. Remote off-board system 110 may include Web browser software that requests and receives data from a server when executed by a processor and displays content to a user operating the system. In one embodiment of the disclosure, remote off-board system 110 is connected to work machine 120 through a local wireless communication device. Remote off-board system 110 may also represent one or more portable, or fixed, service systems that perform diagnostics and/or service operations that include receiving and sending messages to work machine 120. For example, remote off-board system 110 may be an electronic testing device that connects to work machine through an RS-232 serial data link or through wireless communication mediums.

Wireless communication devices 122, 132, and 142 may represent one or more wireless antennae configured to send and/or receive wireless communications to and/or from remote systems, such as off-board system 110 and other work machines. Although devices 122, 132, 142 are shown being configured for wireless communications, other forms of communications are contemplated. For example, work machines 120, 130, and 140 may exchange information with remote systems using any type of wireless, wireline, and/or combination of wireless and wireline communication networks and infrastructures. As shown in FIG. 1, work machine 120 may wirelessly exchange information with work machines 130 and 140, and off-board system 110. Further, work machines 130 and 140 may exchange information with off-board system 110.

Figure 2:
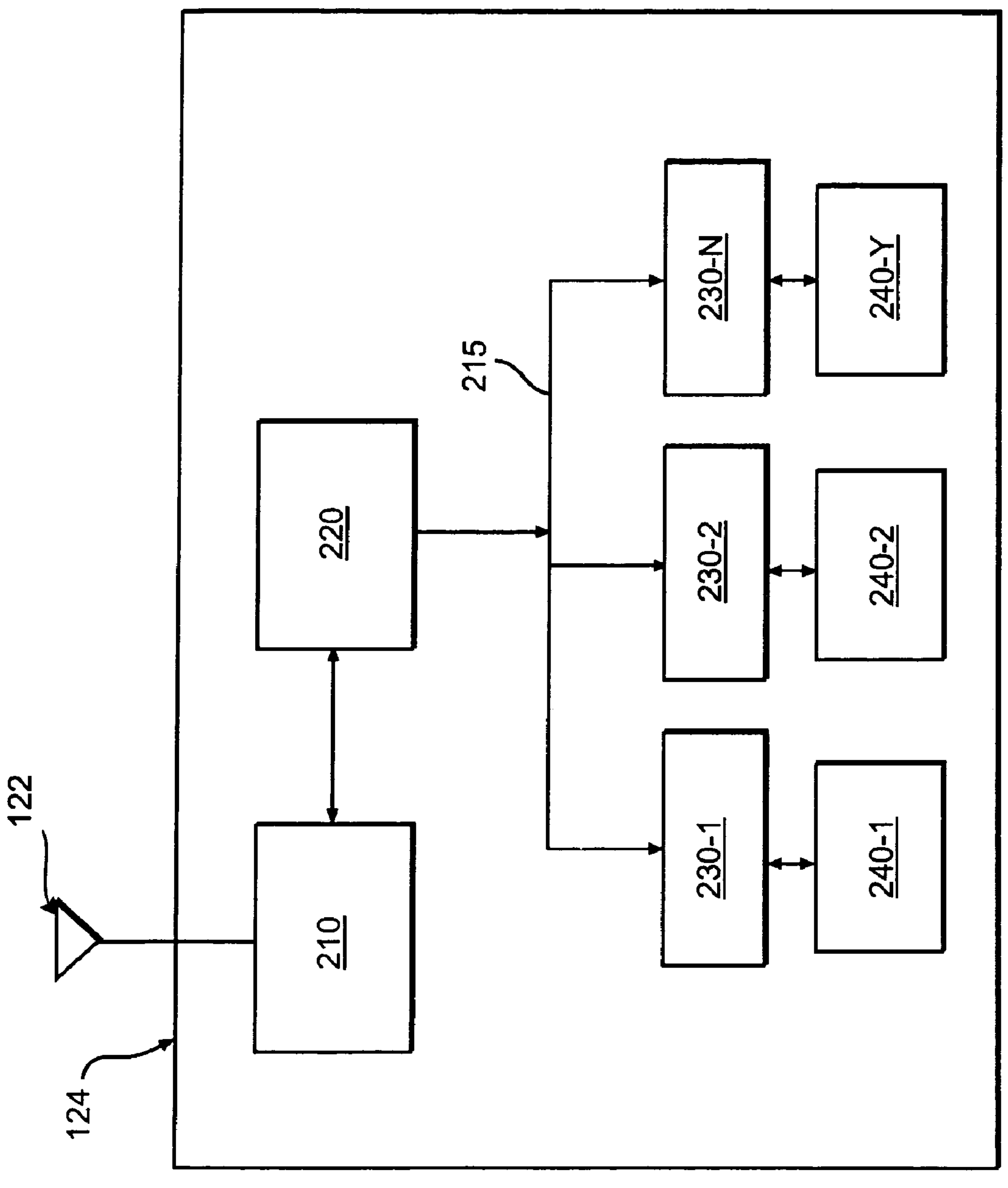
FIG. 2 illustrates a block diagram of an on-board system consistent with certain disclosed embodiments.

On-board systems 124, 134, and 144 may represent a system of one or more on-board modules, interface systems, data links, and other types of components that perform machine processes within work machines 120, 130, and 140. FIG. 2 shows a block diagram of on-board system 124 consistent with certain disclosed embodiments. The following description of on-board system 124 is applicable to on-board systems 134 and 144.

As shown in FIG. 2, on-board system 124 may include a communication module 210, interface control system 220, on-board modules 230-1 to 230-N, and on-board components 240-1 to 240-Y. On-board modules 230-1 to 230-N and interface control system 220 are interconnected by a data link 215. Although interface control system 220 is shown as a separate entity, some embodiments may allow control system 220 to be included as a functional component of one or more of on-board modules (230-1–230-N). Further, although only a specific number of on-board control modules are shown, work machine 120 may include any number of such modules.

Communication module 210 represents one or more devices that are configured to facilitate communications between work machine 120 and one or more remote systems, such as off-board system 110 and other work machines 130, 140. Communication module 210 may include hardware and/or software that enables the device to send and/or receive data messages through wireline or wireless communications. As shown in FIGS. 1 and 2, communication module 210 is connected to communication device 122 for facilitating wireless communications with remote off-board system 110 and work machines (130, 140), although other off-board systems may send and receive data messages to and from communication module 210. The wireless communications may include satellite, cellular, infrared, and any other type of wireless communications that enable work machine 120 to wirelessly exchange information with an off-board system.

An on-board module, as the term is used herein, may represent any type of component operating in a work machine that controls or is controlled by other components or sub-components. For example, an on-board module may be an operator display device control module, an Engine Control Module (ECM), a power system control module, a Global Positioning System (GPS) interface device, an attachment interface that connects one or more sub-components, and any other type of device that work machine 120 may use to facilitate and/or monitor operations of the machine during run time or non-run time conditions (i.e., machine engine running or not running, respectively).

An on-board module, as the term is used herein, may represent any type of component operating in a work machine that controls or is controlled by other components or sub-components. For example, an on-board module may be an operator display device control module, an Engine Control Module (ECM), a power system control module, a Global Positioning System (GPS) interface device, an attachment interface that connects one or more sub-components, and any other type of device that work machine 120 may use to facilitate and/or monitor operations of the machine during run time or non-run time conditions (i.e., machine engine running or not running, respectively).

In one embodiment, interface control system 220 may include various computing components used to perform certain functions consistent with the requirements of that embodiment. To do so, interface control system 220 may include one or more processors and memory devices (not shown). For example, interface control system 220 may include a digital core that includes the logic and processing components used by interface control system 220 to perform interface, communications, and software update functionalities. In one embodiment, the digital core may include one or more processors and internal memories. The memories may represent one or more devices that temporarily store data, instructions, and executable code, or any combination thereof, used by a processor. Further, the memories may represent one or more memory devices that store data temporarily and/or permanently during operation of interface control system 220, such as a cache memory, register device, buffer, queuing memory device, and any type of memory device that maintains information. The internal memory used by interface control system 220 may be any type of memory device, such as flash memory, Static Random Access Memory (SRAM), and battery backed non-volatile memory devices.

For clarity of explanation, FIG. 2 shows interface control system 220 as a distinct element. However, interface control functionality may be implemented via software, hardware, and/or firmware within one or more modules (e.g., 230-1 to 230-N) on an on-board data link. Thus, interface control system 220 may, in certain embodiments, represent functionality or logic embedded within another element of work machine 120.

Modules 230-1 to 230-N may represent one or more on-board modules connected to data link 215 included in work machine 120. Data link 215 may represent a proprietary or non-proprietary data link, such as a Society of Automotive Engineers (SAE) standard data link including Controller Area Network (CAN), J1939, etc. Data link 215 may be wireless or wireline. For example, in one embodiment, work machine 120 may include wireless sensors that are linked together through interface control system 220. Further, although FIG. 2 shows one data link 215, certain embodiments may include additional data links connected to one or more on-board modules 230-1 to 230-N that interconnect additional layers of on-board modules and/or interface control systems.

On-board components 240-1 to 240-Y may represent one or more components that receive data, control signals, commands, and/or information from on-board modules, 230-1 to 230-N, respectively. On board components 240-1 to 240-Y may also represent one or more components that transmit data, control signals, and/or other work data to on board modules 230-1 to 230-N. In certain embodiments, on-board components 240-1 to 240-Y may be controlled by respective on-board modules 230-1 to 230-N through the execution of software processes within these modules. For example, on-board components 240-1 to 240-Y may represent different types of work machine components that perform various operations associated with the type of work machine 120. For instance, on-board component 240-1 may be one or more engine components, while on-board component 240-Y may represent one or more transmission type components.

Figure 3:
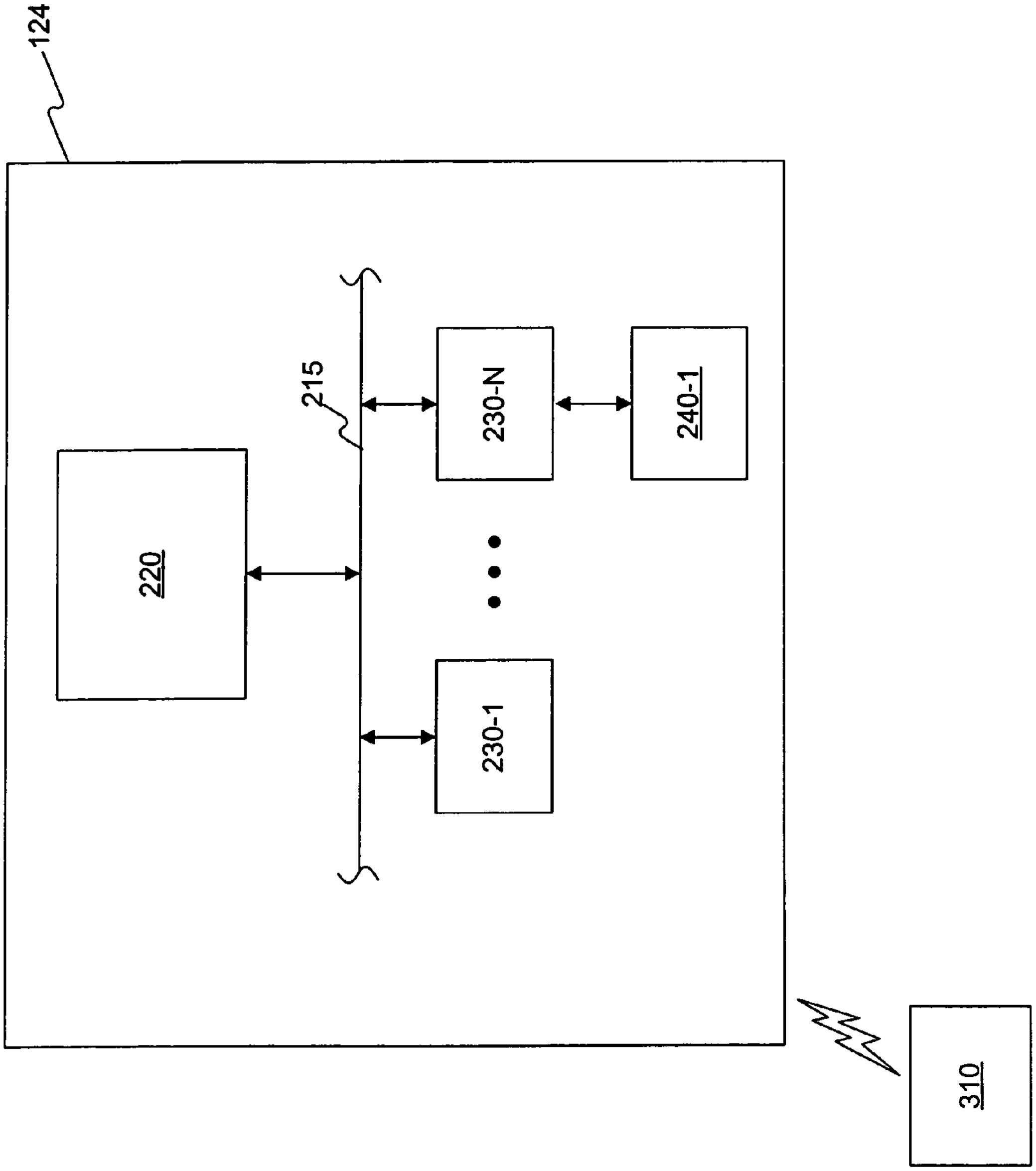
FIG. 3 illustrates a block diagram of exemplary components of the on-board system of FIG. 2, consistent with certain disclosed embodiments.

FIG. 3 will be used to illustrate various embodiments using the on-board modules (230-1 to 230-N) and on-board components (240-1 to 240-Y) discussed above. In one embodiment, at least one of on-board modules 230-1 to 230-N may be configured to receive work machine operation data ("work data"). For the sake of simplicity, FIG. 3 illustrates on-board module 230-1 as being the on-board module configured to receive the work data. However, other on-board modules may be used to receive the work data.

In another embodiment, at least one of on-board components 240-1 to 240-Y may be configured to receive the work data. For the sake of simplicity, FIG. 3 illustrates on-board component 240-Y as being the on-board module configured to receive the work data. However, other on-board components may be used to receive the work data. In this embodiment, the work data received by on-board component 240-Y may be transferred to on-board module 230-N.

In either of the above-mentioned embodiments, one or more identification technologies may be used to identify an operator. For example, a radio frequency device 310 (e.g., an RFID tag) may be used to identify an operator. Radio frequency device 310 may consist of a chip attached to an antenna. A scanner (not shown), which may be located at an on-board module 230-1 or on-board component module 240-Y, may be used to scan the chip. In a passive device, a small amount of radio frequency is passed from the scanner to energize the chip, which then emits a radio frequency signal transmitting an operator's unique personal verification (chip ID) number. In an active device, the chip may provide a power source for emitting the radio frequency signal. The radio frequency signal transfers the chip ID to interface control system 220 for verification.

Additionally, or alternatively, on-board system 124 may include means for receiving an operator identification code. Such means may include, for example, a switch or similar device, configured to receive key data from a key device (e.g., smart card, smart key, etc.) having operator identification data stored therein.

In addition to the operator identification information, through various sensors (not shown) connected, or transmitting data, to on-board modules (230-1 to 230-N) and/or on-board components (240-1 to 240-Y), interface control system 220 may collect the work data. For example, the work data may include data such as gas consumption, load weight, idle time, number of engine starts, load type, work machine type, terrain type, terrain grade, type of material manipulated by the work machine, hours of operation, fluid levels, fluid consumptions, work site parameter data, and any other type of information related to work machine 120 and/or the work site, terrain etc., associated with work machine 120.

In the above embodiment, interface control system 220 may collect the operator identification information and work data. The collected information may be transferred to an off-board system, such as remote off-board system 110, which may represent one or more computing systems associated with a business entity corresponding to work machines 120, 130, and 140 (FIG. 1), such as a manufacturer, dealer, retailer, owner, project site manager, a department of a business entity (e.g., service center, operations support center, logistics center, etc.), or any other type of entity that generates, maintains, sends, and/or receives information associated with machines 120, 130, and 140.

Through wireless communication devices 122, 132, and 142 (FIG. 1), interface control system 220 may transmit the collected work data and operator identification information to remote systems, such as off-board system 110 and other work machines. In one embodiment, interface control system 220 may transmit the collected information to the remote system(s) in response to a request or an event. The request may be initiated by a component of work machine 120. Further, the event may be associated with a hardware or software event, such as a command initiated by a program for providing automatic scheduled communications (e.g., periodic reporting applications, etc.).

Figure 4B:
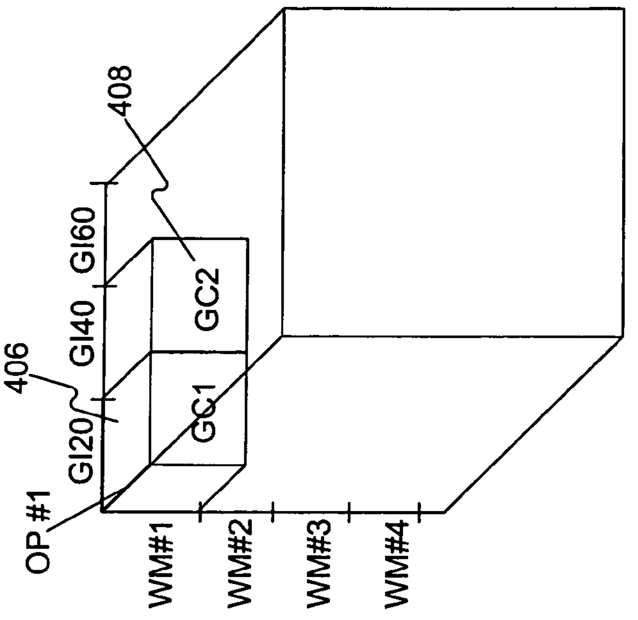
FIGS. 4A and 4B illustrate exemplary database structures consistent with certain disclosed embodiments.
Figure 4A:
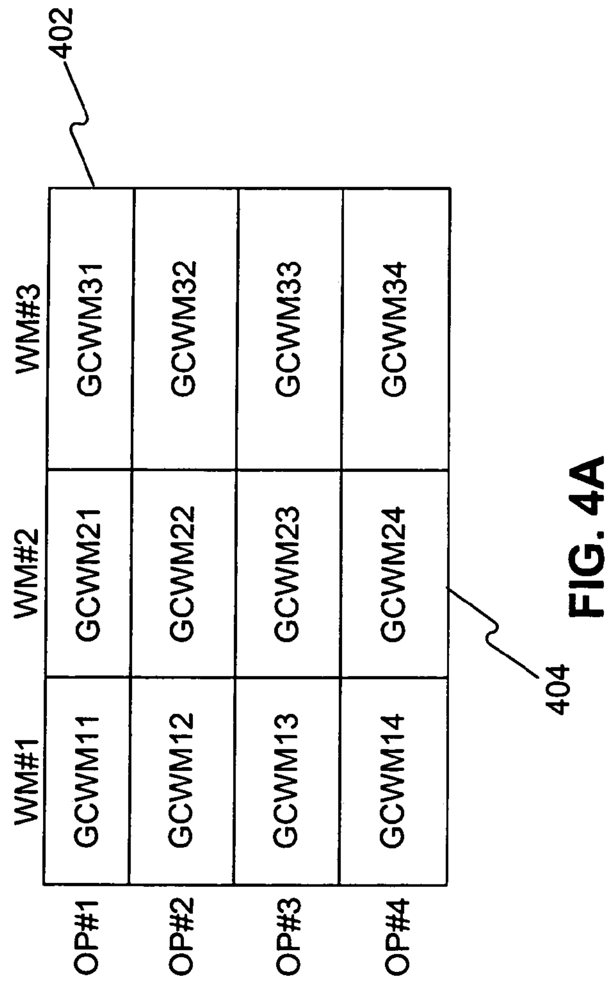

In one embodiment, off-board system 110 may receive and process the operator identification and work data. FIG. 4A illustrates and exemplary database structure for storing and presenting operator identification and work data. The database structure shown in FIG. 4A may be stored in a memory device in a work machine or off-board system 110 and is accessible and used by a processing device configured to perform processes consistent with the disclosed embodiments.

In FIG. 4A, for exemplary purposes only, the gas consumption (GC) for each of a plurality of work machines (WM#) is indexed based on respective operator identification information (OP#). For example, the gas consumption for work machine #3 (WM#3) is indexed based on the operator identification information for operator (OP#1) and is stored in cell 402. In similar fashion, the gas consumption for work machine #2 (WM#2) is indexed based on the operator identification for operator #4 (OP#4) and is stored in cell 404.

The values corresponding to the gas consumption stored in the cells of the exemplary database structure (e.g., GCWM11) may reflect an amount of fuel consumed by each respective work machine over a predetermined period of time, such as between reporting events, a defined number of operating hours, etc. It should be noted that the fuel consumption data is exemplary, and any type of work data may be collected and stored in the database structures described herein.

In another embodiment, off-board system 110 may receive and process the operator identification information and work data. The work data may be indexed based on the operator identification information and take into account other work machine related parameters. In this embodiment, the operator identification information and work data may be stored and presented in a three-dimensional matrix. FIG. 4B illustrates an exemplary database structure for storing and presenting operator identification, work data, and a work machine related parameter. In FIG. 4B, the gas consumption for each work machine (WM#) is indexed based on the operator identification information (OP#) and the grade incline (GI) for the worksite where the work machine is being used. For example, the gas consumption for work machine #1 (WM#1) is indexed based on the operator identification information for operator (OP#1) and a grade incline of 20 degrees (GI20) and is stored in cell 406. In similar fashion, the gas consumption for work machine #1 (WM#1) is indexed based on the operator identification for operator #1 (OP#1) and a grade incline of 40 degrees (GI40) and is stored in cell 408.

In addition to the fuel consumption discussed above, other work data (e.g., load weight, number of engine starts, engine idle time, etc.) and work machine related parameters (if required) may be indexed to an identified operator. FIGS. 4A and 4B are non-limiting exemplary database structures. Other structures known in the art may used to store and present the operator identification information, work data, and the work machine related parameters.

In the above mentioned embodiments, off-board system 110 may provide the collected work data, operator identification, and work related parameters (if required) to an operator interface (not shown). In the same or in an alternate embodiment, interface control system 220 may also provide the collected work data, operator identification, and work related parameters (if required) to an operator interface (not shown). Through the operator interface, an operator may instruct off-board system 110 and/or interface control system 220 to provide work machine utilization metrics using the stored work data, operator identification, and work related parameters (if required).

Figure 5:
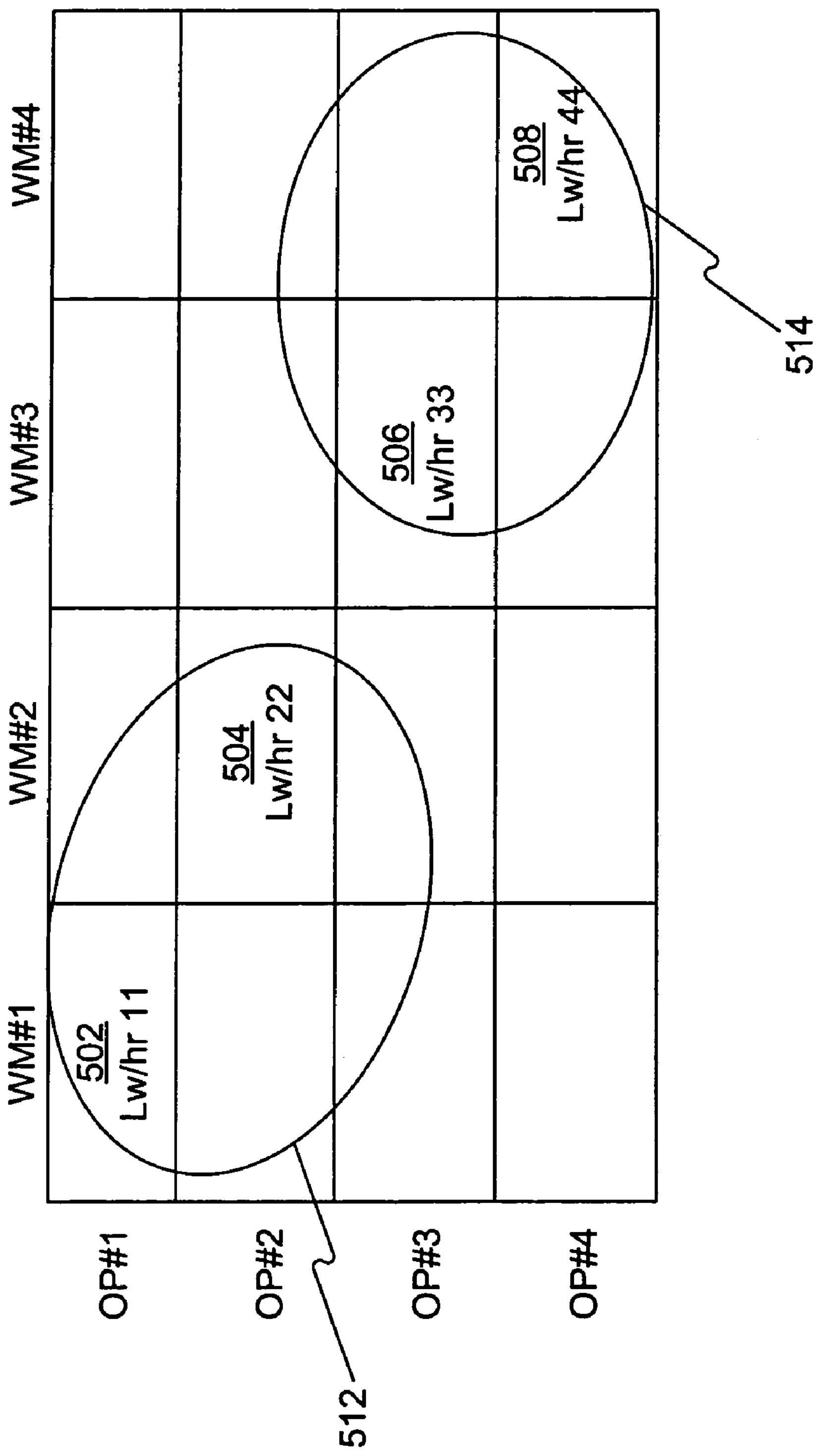
FIG. 5 illustrates an exemplary database structure showing exemplary metric groupings consistent with certain disclosed embodiments.

These metrics may reflect quantitative values associated with the performance of a work machine, operator, or groups of work machines and/or operators. For example, FIG. 5 shows a block diagram of exemplary work machine utilization metrics in which the load weight/hour (Lw/hr) of a group of work machines are grouped for analysis to determine the performance of the group. In this example, the work data (Lw/hr 502) for work machine #1 (WM#1) and operator #1 (OP#1) and the work data (Lw/hr 504) for work machine 2 (WM#2) and operator #2 (OP#2) are represented as group 512. Similarly, the work data (Lw/hr 506) for work machine #3 (WM#3) and operator #3 (OP#3) and the work data (Lw/hr 508) for work machine 4 (WM#4) and operator #4 (OP#4) are represented as group 514. These exemplary groupings may be used to analyze the performance of a particular worksite or group of work machines under the supervision of a particular individual or group of individuals.

Figure 6:
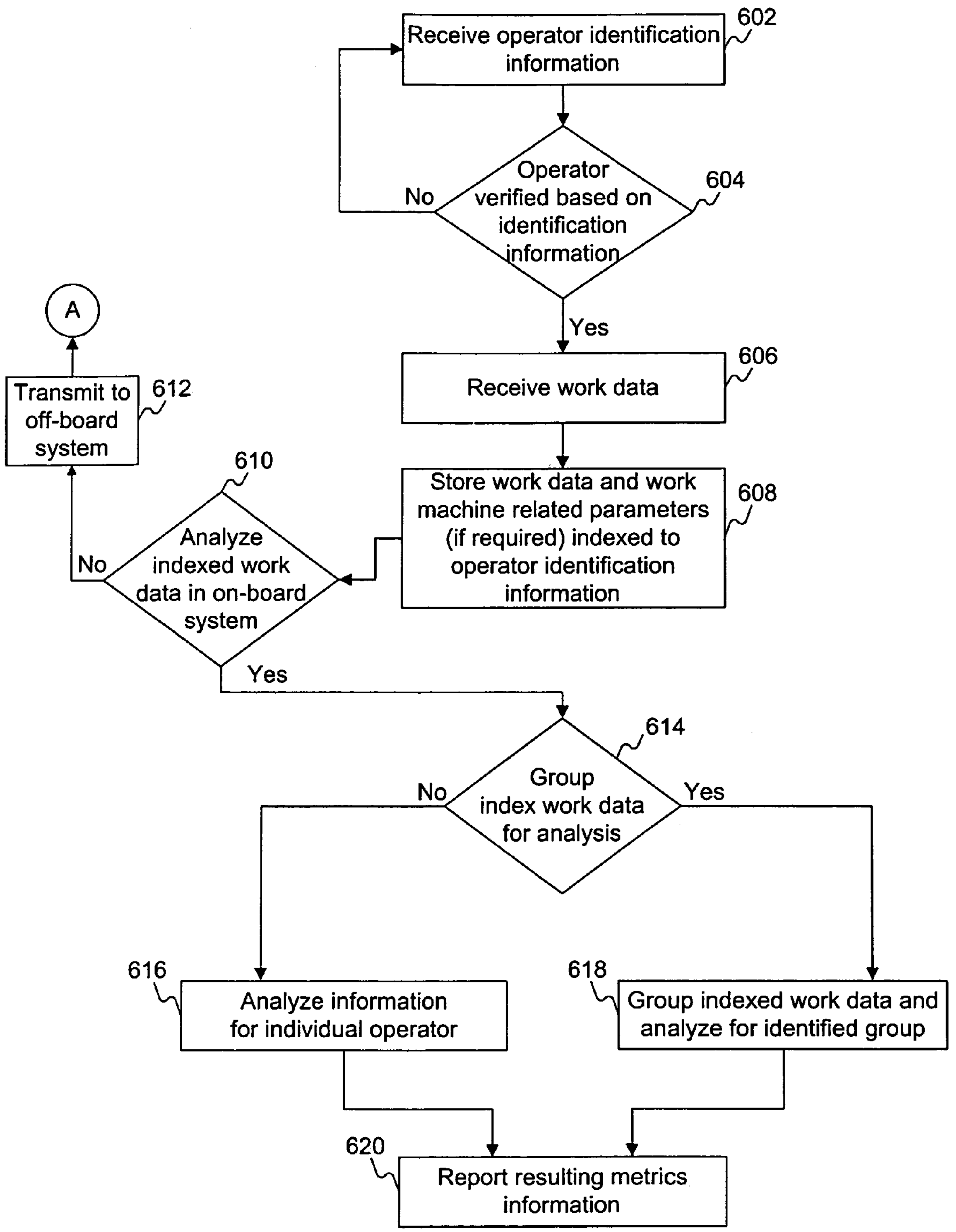
FIG. 6 illustrates a flow chart of an exemplary process for performing work machine utilization metrics consistent with certain disclosed embodiments.

FIG. 6 shows a flowchart of an exemplary process for providing work machine utilization metrics. Consistent with the disclosed embodiments, interface control system 220 may receive operator identification information (Step 602). As explained, different types of identification technologies may be used to identify an operator. For example, a radio frequency device 310 (FIG. 3) or smart card/key device may be used to transmit a chip ID to interface control system 220 for verification of the operator. If the operator is not verified based on the identification information, interface control system 220 may return to Step 602 to receive additional operator identification information (Step 604; no).

If the operator is verified (Step 604; yes), interface control system 220 receives the work data associated with its respective work machine (Step 606). At some point, interface control system 220 stores the work data and work related parameters (if required) indexed to the operator identification information. (Step 608).

At Step 610, interface control system 220 determines whether the indexed work data is to be analyzed on-board. If this determination is in the affirmative (Step 610; yes), interface control system 220 further determines if the indexed work data is to be grouped for analysis (Step 614). If this determination is in the affirmative (Step 614; yes), interface control system 220 may group and analyze the data based on the identified group (Step 618).

Analysis of the work data may include determining metric values for various mapped combinations of work machine parameter and operator identifiers. These metrics may be compared to determine those work machines and/or operators that either display efficient or non-efficient operations. The efficiency of these entities may be based on a relationship of metrics collected for a plurality of similar type entities associated with similar parameters, work site types, terrain types, and/or work machine types. For example, it may be appropriate to refrain from analyzing or comparing the performance metrics of an operator using a loader machine in a mining work site with an operator using a loader machine in an agricultural work site. Along the same lines, it may be desirable to refrain from analyzing and comparing operators using different types of work machines. The above noted rules are exemplary and are not intended to be limiting. Certain embodiments may include metric analysis of different work machine types, work site types, etc.

Once the interface control system 220 completes its analysis, the results from this processing may be reported for subsequent review by a computer implemented process or an individual (Step 620). However, if interface control system 220 determines that the indexed work data is not to be grouped (Step 614; no), the indexed work data is analyzed for an individual operator (Step 616) and the resulting metrics information is reported to an operator (Step 620).

Figure 7:
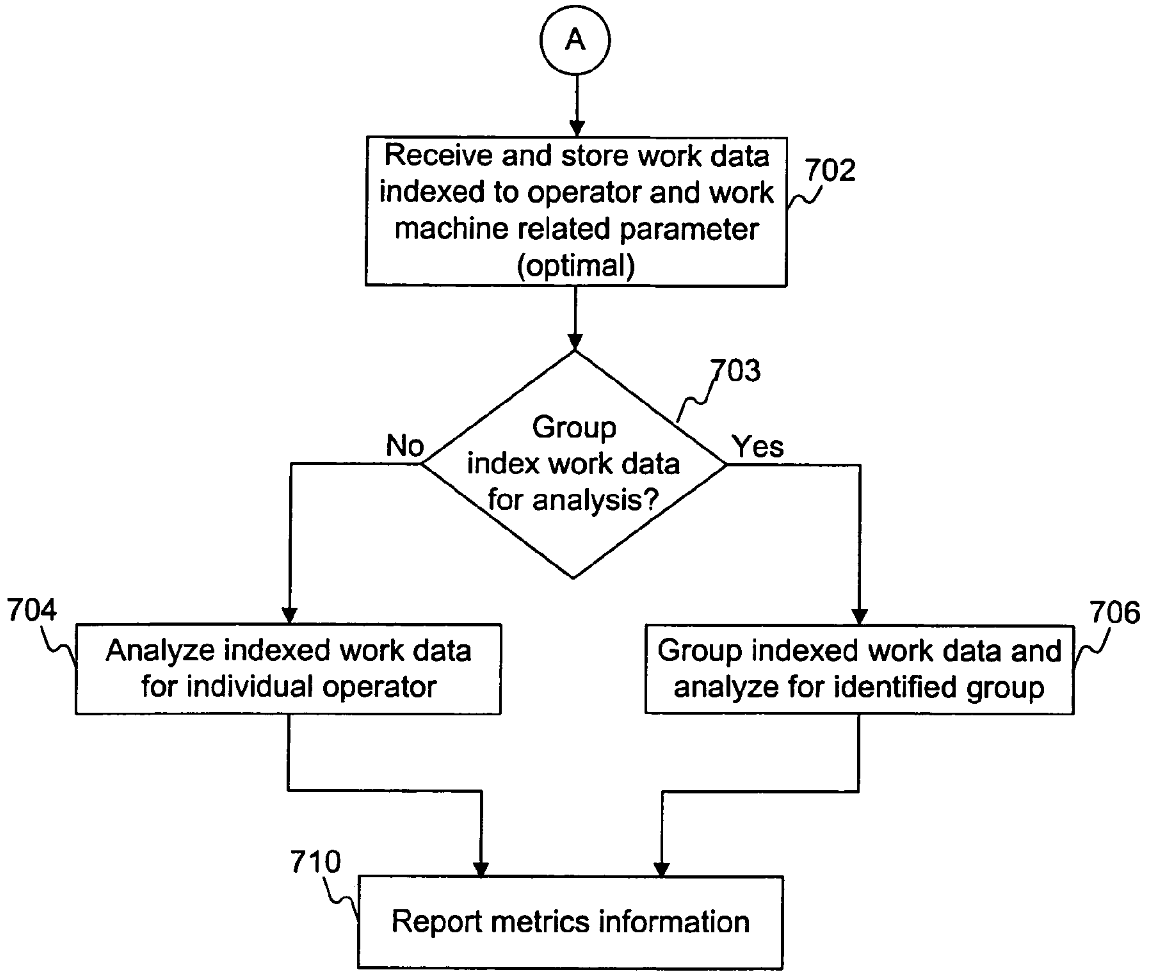
FIG. 7 illustrates a flow chart of an exemplary process that may be performed by an off-board system consistent with certain disclosed embodiments.

If at Step 610, interface control system 220 determines that indexed work data is to be analyzed by an off-board system (Step 610; no), the indexed work data is transmitted to an off-board system, such as remote off-board system 110. FIG. 7 is an exemplary flow chart showing the process that may be performed by the off-board system. As FIG. 7 illustrates, the off-board system receives and stores the indexed work data (Step 702) transmitted from interface control system 220 and, at some point, determines if the indexed work data is to be grouped for analysis (Step 703). If this determination is in the affirmative (Step 703; yes), the indexed work data is grouped and analyzed based on the identified group (Step 706) in a manner consistent with the processes described above in connection with steps 618 and 616 of FIG. 6. The resulting metrics information from the analysis may be reported to a computer implemented process and/or individual for subsequent analysis, display, etc. (Step 710). However, if the off-board system determines that the indexed work data is not to be grouped (Step 703; no), the indexed work data is analyzed for an individual operator (Step 704) and the resulting metrics information is reported to a computer implemented process or individual for subsequent analysis, display, etc. (Step 710).

INDUSTRIAL APPLICABILITY

Methods and systems consistent with exemplary disclosed embodiments allow work machines to receive operator identification information and index work data (e.g., fuel consumption, load weight, engine starts, engine idle time, etc.), and other work machine related parameters (if required), to the operator identification information. Utilizing the disclosed methods and systems, it is possible to identify an operator and index work data and work machine related parameters, if required, to the operator. The indexed information may be provided to a user interface at the work machine or transmitted to an off-board system for display on a user interface. Based on the indexed information, work machine utilization metrics may be performed to improve work machine performance.

In certain embodiments, the results form the metric analysis processes performed by either off-board system 110 or work machine 120 may be further processed to adjust operations associated with the monitored operators and/or work machines. For instance, a software program or individual may analyze the performance information for a certain type of work machine operated by different operators in a common work site over a predetermined period of time. Using the parameter data, the process or individual may identify those operators who are more efficient in operating the monitored work machine. For example, the value GCWM12 in FIG. 4A may reflect that OP#2 uses less fuel over a similar time period than OP#1, based on the value GCWM11. As explained, further analysis may be performed using the three or n-dimensional data relationships stored in the data structure shown in FIG. 4B. Accordingly, the operations of work machines and operators may be monitored and adjusted through use of the systems and methods consistent with certain disclosed embodiments.

Another application of the disclosed embodiments include managing the performance of a fleet or work machines operating at one or more work sites. That is, certain embodiments enable an individual or an entity to process individual, or groups of, machine operational data indexed by one or more operators into work site and fleet utilization metrics. Using these metrics, the individual or entity operating off-board system 110, or a work machine, may manage the operations and performance of a fleet of machines and make adjustments to the machine operations. For example, if a group of work machines operating at a particular work site are associated with utilization metrics that reflect an inefficient performance of one or more tasks at the work site, the individual or entity may reassign the operators of the machines in an attempt to increase efficiency and performance of those machines. Additionally, the individual or entity may reassign tasks to selected work machines and/or operators based on the metrics evaluated by off-board system 110. Moreover, individuals in charge of managing one or more of the machines at the work site may also be reassigned, such as changing foreman or supervisors based on the determined metrics of the one or more work machines.

In another embodiment, off-board system 110, or a work machine (e.g., work machine 120) may be configured to analyze the determine metrics of one or more work machines to manage the performance and operations of multiple work sites. For example, a manager of a company that have work machines operating at multiple work sites may assess the performance of each of the work sites, fleets of work machines, and/or individual or groups of individuals based on the indexed utilization metrics determined from the operational data collected from the machines operating at those work sites. Based on the assessment, the manager may reassign machines, operators, and/or tasks at one or more of these work sites. The performance assessments may be performed manually and/or automatically through the use of software programs configured to evaluate the collected metrics.

Other embodiments, features, aspects, and principles of the disclosed exemplary systems may be implemented in various environments and are not limited to work site environment. For example, a work machine having the features of the disclosed system may perform the functions described herein in other environments, such as mobile environments between job sites, geographic locations, and settings. Further, the processes disclosed herein are not inherently related to any particular system and may be implemented by a suitable combination of electrical-based components. Embodiments other than those expressly described herein will be apparent to those skilled in the art from consideration of the specification and practice of the disclosed systems. It is intended that the specification and examples be considered as exemplary only, with the true scope of the invention being indicated by the following claims.

What is claimed is:

1. A system for providing indexed machine utilization metrics, comprising:

an operator identification device configured to identify an operator of a first machine based on operator identification data;

a work data collection device configured to collect work data related to the first machine;

a first processing device configured to generate indexed information reflecting an index of the collected work data to the operator identification data and a work site characteristic of a first work site that the first machine is located in when operated by at least the operator;

a communication device configured to transmit the indexed information; and a second processing device configured to receive the indexed information and provide operator utilization metrics based on the indexed information that reflects a quantitative performance value associated with at least one of the first machine and operator.

2. The system of claim 1, wherein the operator identification device is at least one of a radio frequency identification device, a magnetic identification device, and an infrared identification device.

3. The system of claim 1, wherein at least one of the first processing device and second processing device is configured to group the indexed information with second indexed information associated with at least a second machine based on at least one of the type of first machine, the type of second machine, and the work site characteristic.

4. The system of claim 3, wherein at least one of the first processing device and second processing device is configured to analyze the grouped indexed and second indexed information to determine the performance of at least one of the first machine, the second machine, the first work site, a second work site associated with the second machine, and a collective work site including the first work site and second work site.

5. The system of claim 1, wherein the work data collection device includes at least one of an on-board module and an on-board component.

6. The system of claim 5, wherein the work data collected by the at least one of an on-board module and an on-board component is performance data relating to at least one operation parameter of the first machine.

7. The system of claim 1, wherein the work data includes data representing at least one of fuel consumption, idle time, number of engine starts, weight of material transported, hours of operation, type of material manipulated by the first machine, terrain feature data, fluid related data, work site related data, and mileage traveled.

8. The system of claim 1, wherein the second processing device analyzes the indexed information to determine the performance of a group of machines including the first machine.

9. The system of claim 1, wherein the second processing device analyzes the indexed information to determine the performance of at least one of:

the operator;

a group of operators that operate the first machine;

a group of machines that are of a similar type as the first machine;

an individual associated with at least one of the first machine and the first work site; and the first work site.

10. The system of claim 1, wherein the second processing device analyzes the indexed information to determine the performance of the first worksite.

11. The system of claim 1, wherein the work site characteristic includes at least one terrain characteristic of the first work site.

12. The system of claim 1, further including an operator interface for receiving the indexed work data from at least one of the first processing device and the second processing device.

13. The system of claim 1, wherein the first processing device is at least one of an on-board module and on-board component, and the second processing device is part of an off-board system.

14. The system of claim 1, wherein the first processing device indexes one or more work machine related parameters to the operator identification data.

15. A method for providing indexed machine utilization metrics, comprising:

identifying an operator of a first machine based on operator identification data;

collecting work data from the first machine;

generating indexed information reflecting an index of the collected work data to the operator identification data, and a work site characteristic of a first work site that the first machine is located in when operated by at least the operator with a processing device at the first machine;

transmitting the indexed information to a processing system; and receiving the indexed information at the processing system and providing operator utilization metrics based on the indexed information that reflects a quantitative performance value associated with at least one of the first machine and operator.

16. The method of claim 15, wherein identifying the operator includes using at least one of a radio frequency identification device, a magnetic identification device, and an infrared identification device.

17. The method of claim 15, further including:

grouping the indexed information with second indexed information associated with at least a second machine based on at least one of the type of first machine, the type of second machine, and the work site characteristic.

18. The method of claim 17, further including:

analyzing the grouped indexed and second indexed information to determine the performance of at least one of the first machine, the second machine, the first work site, a second work site associated with the second machine, and a collective work site including the first work site and second work site.

19. The method of claim 15, wherein collecting the work data includes using at least one of an on-board module and an on-board component to collect the work data.

20. The method of claim 19, wherein collecting the work data includes using the at least one of an on-board module and an on-board component to collect parameter data relating to an operation of the first machine.

21. The method of claim 15, wherein collecting the work data includes collecting performance data representing at least one of fuel consumption, idle time, number of engine starts, weight of material transported, hours of operation, type of material manipulated by the first machine, terrain feature data, fluid related data, work site related data, and mileage traveled.

22. The method of claim 15, wherein providing operator utilization metrics includes determining the performance of a group of work machines including the first machine based on the indexed information.

23. The system of claim 15, wherein providing the operator utilization metrics includes analyzing the indexed information to determine the performance of at least one of:

the operator;

a group of operators that operate the first machine;

a group of machines that are of a similar type as the first machine;

an individual associated with at least one of the first machine and the first work site; and the first work site.

24. The method of claim 15, wherein further including analyzing the indexed information determining the performance of a worksite.

25. The method of claim 15, wherein the work site characteristic includes at least one terrain characteristic of the first work site.

26. The method of claim 15, further including displaying the indexed work data at an operator interface at at least one of an on-board system located on the first machine and an off-board system located remote to the first machine.

27. The method of claim 15, wherein the processing system is an off-board system.

28. The method of claim 27, wherein the off-board system collects second work data from a second machine and the method further includes:

indexing the work data and second work data to at least one of the first machine and second machine.

29. The method of claim 28, wherein the method further includes providing the operator utilization metrics based on the indexed work data and second work data.

30. The method of claim 28, wherein the first machine and second machine operate in the first work site and the work data and second work data are indexed according to the type of first work site.

31. The method of claim 15, further including indexing a plurality of machine related parameters to the operator identification data.

32. A system for providing indexed machine utilization metrics, comprising:

means for identifying an operator of a first machine based on operator identification data;

means for collecting work data from the first machine;

means for generating indexed information reflecting an index of the collected work data to the operator identification data, and a work site characteristic of a first work site that the first machine is located in when operated by at least the operator at the first machine;

means for transmitting the indexed information to an off-board system; and means for receiving the indexed information at the off-board system and providing operator utilization metrics based on the indexed information that reflects a quantitative performance value associated with at least one of the first machine and operator.

33. The system of claim 32, wherein the processing system is an off-board system.

34. The system of claim 33, wherein the off-board system collects second work data from a second machine and the system further includes:

means for indexing the work data and second work data to at least one of the first machine and second machine.

35. The system of claim 34, further includes means for providing the operator utilization metrics based on the indexed information.

36. The system of claim 33, wherein the first machine and second machine operate in the first work site and the work data and second work data are indexed according to the type of first work site.

37. The system of claim 32, wherein the means for indexing indexes a plurality of machine related parameters to the operator identification data.

38. A computer-readable media having computer executable instructions for performing steps, comprising:

identifying an operator of a first machine based on operator identification data;

collecting work data from the first machine;

generating indexed information reflecting an index of the collected work data to the operator identification data, and a work site characteristic of a first work site that the first machine is located in when operated by at least the operator with a processing device at the first machine transmitting the indexed information to a processing system to provide operator utilization metrics based on the indexed information that reflects a quantitative performance value associated with at least one of the first machine and operator.

39. The computer-readable media of claim 38, further including instructions for collecting performance data representing at least one of fuel consumption, idle time, number of engine starts, weight of material transported, hours of operation, type of material manipulated by the first machine, terrain feature data, fluid related data, work site related data, and mileage traveled.

40. The computer-readable media of claim 38, wherein providing operator utilization metrics further includes determining the performance of a group of machines including the first machine based on the operator utilization metrics.

41. The computer-readable media of claim 38, wherein providing operator utilization metrics further includes determining the performance of the first worksite.

42. The computer-readable media of claim 38, wherein the work site characteristic includes at least one terrain characteristic of the first work site.

43. The computer-readable media of claim 38, further including instructions for displaying the indexed work data at an operator interface at least one of an on-board machine included in the first machine and an off-board system.

44. The computer-readable media of claim 38, further including instructions for indexing a plurality of machine related parameters to the operator identification data.

* * * * *